April 20, 1943.  I. L. MEIER  2,317,103
MANUFACTURE OF DENTAL CROWNS
Filed Aug. 14, 1940
Fig. 1.
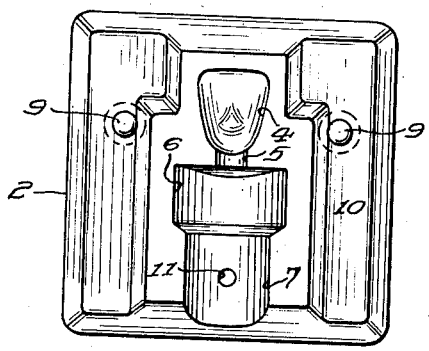
Fig. 2.
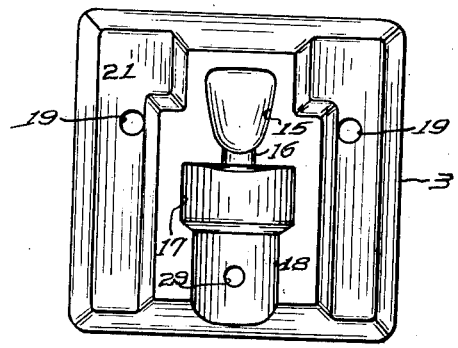
Fig. 3.
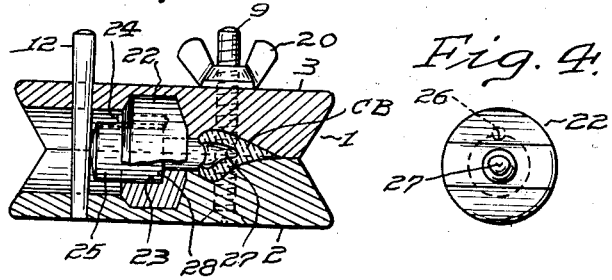
Fig. 4.
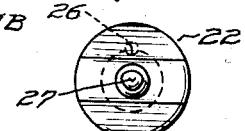
Fig. 5.
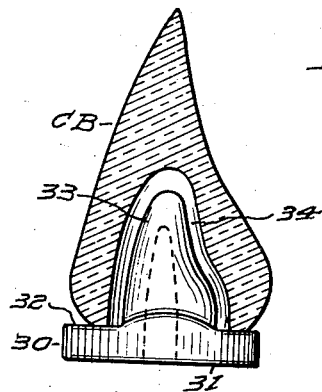
Fig. 7.
Fig. 6.
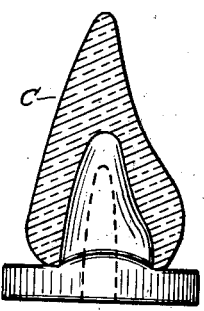
WITNESS
F. J. Hartman.
INVENTOR
Ida L. Meier.
BY
ATTORNEY Patented Apr. 20, 1943

2,317,103

UNITED STATES PATENT OFFICE 2,317,103

MANUFACTURE OF DENTAL CROWNS

Ida L. Meier, Philadelphia, Pa.

Application August 14, 1940, Serial No. 352,540

7 Claims. (Cl. 18—55.1)

This invention relates to the production of dental crowns and other ceramic tooth structure and more particularly to a novel method of manufacture whereby a crown of predetermined correct size and shape is made available for immediate use upon a tooth stub as soon as the latter has been prepared for its reception.

It has heretofore ben customary for the dental practitioner to initially prepare a tooth for receiving a crown by grinding it to any apparently suitable arbitrarily selected form and then to make a mold or impression of the prepared tooth stub, which mold or impression is then used by the ceramist to make a form upon which the crown is constructed first by building it up by hand on the form, usually by brushing onto it successive layers of a plastic porcelain mix or like material, the latter being thereafter subjected to "cooking" or "baking" heat for setting and vitrifying the porcelain. Such crowns are usually annealed or other finishing operations are performed upon them before they are ready for use and it therefore sometimes requires a period of several days to produce a finished crown; the patient meanwhile has to tolerate the inconvenience and unpleasantness arising from having, instead of either the old tooth or a crown, nothing more than the stub of the tooth, while the porcelain in crowns made in this way has generally been less strong and otherwise inferior to that in articles made of molded dental porcelain, such as pivot teeth. It has heretofore been impractical, however, to produce fully molded porcelain crowns, and such crowns as have been made from molded porcelain have usually been molded pivot teeth converted to crowns by grinding out the pivot socket by hand to provide the enlarged cavity essential in a crown. Such grinding, however, in addition to being an arduous and time consuming operation, sometimes causes undue weakening of the porcelain, and in any case materially enhances the possibilities of inaccuracy of fit between the prepared tooth stub and the crown.

In accordance with the present invention, fully molded porcelain dental crowns are readily produced in predetermined sizes and shapes and a large assortment thereof made available to the dentist in advance of the preparation of a tooth for the reception of a crown while the laborious hand work incident to grinding out the requisite cavity in the interior of a molded porcelain pivot tooth or the like is eliminated. Furthermore, the fully molded crown may be applied to the tooth stub as soon as it is prepared for crown reception, thereby eliminating the delays incident to the production of a crown either by grinding a pivot tooth or making it by hand on a mold conforming to an impression taken from the previously prepared tooth stub.

Moreover, crowns produced in accordance with the invention, being molded under pressure, are stronger, more uniform and of better appearance than crowns heretofore made from "brushed on" porcelain mixes and as their production involves but a minimum of hand labor, they can be manufactured in quantity at relatively low cost.

It is therefore a principal object of the invention to provide a method of making a molded porcelain dental crown having a cavity adapted for the reception of a prepared tooth stub in which the necessary "firing" or baking of the plastic porcelain mix of which the crown is made may be satisfactorily carried out and the desired contour of the cavity and of the crown as a whole preserved, the outside of the crown at the same time attaining a surface glaze comparable in appearance to natural tooth enamel.

Another object is to provide a method of molding dental crowns whereby a porcelain or generally similar plastic mix may be firmly compacted in a mold to substantially maximum density with exclusion of occluded air and gas bubbles and then dried by mild heat before being removed from the mold and subjected to the requisite final baking heat.

A further object is to provide a method in accordance with which molded and partially completed dental crown may be removed from the mold in which it is formed and then baked with its outer surface free of contact with any articles which might tend to impair the glaze or surface finish normally imparted to it by the baking heat.

Other objects, purposes and advantages of the invention will hereafter more fully appear or will be understood from the following description of the practice of the method contemplated thereby in which reference will be had to the accompanying drawing illustrating apparatus adapted to be utilized in accordance therewith for producing incisor crowns.

In the said drawing Fig. 1 is a top plan view of one part of a mold in which the porcelain mix for the crown is initially formed;

Fig. 2 is a corresponding view of a complementary mold part;

Fig. 3 is a longitudinal section of the assembled mold as a whole;

Fig. 4 is an end view of certain internal parts removed from the mold;

Fig. 5 is a side elevation partly in section on a greatly enlarged scale illustrating an intermediate step in the manufacture of a crown;

Fig. 6 is a similar view, also enlarged, after the crown has been subjected to a further step to substantially complete its manufacture;

Fig. 7 is a side elevation partly in section of a matrix which facilitates accurate preparation of a tooth for the reception of said crown.

In the several figures like characters are used to designate the same parts.

To facilitate an understanding of the invention, I shall herein refer first generally to the several operations incident to the production of a molded crown in accordance therewith and then describe them more fully with relation to the apparatus shown in the drawing which is designed and adapted to facilitate their performance.

Thus I first prepare a suitable porcelain mix, preferably one of the character of those generally utilized in the manufacture of molded pivot teeth and other molded porcelain articles, tinting it in accordance with usual practices, and then form a quantity of it into a shape substantially similar to that of the external contour of the crown to be made but on a larger scale. The dimensions of this shape are desirably proportioned to those of the crown to be made in ratios generally between 1.00:0.87 and 1.00:0.75. That is, the shrinkage of the mix during subsequent processing may reduce all dimensions of the original form by 13% to 25% depending on the nature of the mix itself, the subsequent treatments to which it is subjected and/or other factors and I usually prefer to allow, on an average, for about 17% shrinkage and thus make a crown blank larger than the crown to be produced, in the ratio of 1.00:83 approximately.

In accordance with the invention, such crown blank is desirably shaped in a specially prepared two part mold having a mold cavity of the proper form corresponding to the external contour of the crown to be made, but on a suitably larger scale, with its end representing the base of the crown, i. e. that part which is to be fitted to the prepared tooth stub and adjacent gum, open and accessible for insertion of a die into the mold cavity as hereafter more fully explained.

After the plastic mass has been preliminarily formed in this mold cavity but without material pressure being exerted upon it, a male die is inserted into the open end of said cavity and pressed into the mass with considerable force. The male die used in this operation preferably corresponds to the form of the prepared tooth stub to which the crown is to be applied, but is larger in all its dimensions to compensate for shrinkage, as above explained in connection with the mold cavity, and as the die is forced into the mass in the mold cavity it compresses the material, expresses from it any excessive fluid binder and/or occluded air, and imparts to it the maximum density and compactness attainable without the use of heat. Simultaneously the die impresses in the mass a cavity which, when subsequently reduced by shrinkage, will conform to the complement of the prepared tooth stub.

After the formed porcelain mass, now constituting a more or less dense crown blank, has been thus prepared, and while still confined by the mold and die as described, it is subjected to a mild heat to "dry" it by driving off moisture and volatile constituents and further solidify the residual solid material. The drying temperature, usually between 300 and 500° F., does not fuse the porcelain mix, but usually imparts to the crown blank sufficient inherent strength to enable it to be substantially self-supporting after it has cooled to room temperature. It may thereupon be taken from the mold, withdrawn from the die which formed the cavity in it, and placed upon a generally similar but smaller die whose form and dimensions correspond exactly to those of the prepared tooth stub and adjacent narrow peripheral shoulder of the natural "gum line." Such die, after the blank has been placed on it, is the only object touching the blank, and the latter is kept thereby out of contact with other objects during the subsequent "baking" or substantial fusing and vitrifying of the porcelain. The die is therefore preferably made from a non-corrosive material having low coefficient of expansion, to inhibit any chemical reaction with or staining of the porcelain during baking, insure final accuracy of the shaping of its tooth stub receiving cavity and surrounding "gum line" edge and avoid cracking or straining the porcelain during heating and/or cooling. I have found that platinum is a material well suited for making such dies, as it possesses to a satisfactory degree all the essential properties, but because it is expensive, other materials may sometimes be preferred.

While thus supported from the die, the crown blank is subjected to a baking heat for a period and at a temperature determined by the character of the porcelain and other factors familiar to those skilled in the ceramic arts. It is preferable to attain some fusion of the outer surfaces of the crown blank so as to impart a high glaze simulating natural enamel to parts of the finished crown exposed while in use, and the baking temperature will therefore usually approach the fusing temperature of the porcelain, 1600° F. being preferred therefor when a porcelain fusing at 1700° F. is used.

It is sometimes necessary to anneal the crown after baking, or to subject it to other finishing operations, and for these it may be left on the baking die or removed therefrom as desired, but the die is primarily for the purpose or insuring proper contouring of those surfaces of the crown which must conform to the prepared tooth stub and adjacent gum, and preventing excessive shrinkage or other deformity of the blank during baking.

The baked crown may be readily removed from the die after cooling, as the contraction of the latter is normally sufficient to readily free it therefrom, but the die may be given a thin coat of pure shellac before the crown blank is placed on it, if desired, and when the die is initially so coated, a substantially microscopic deposit of carbon or ash remains between it and crown surfaces after baking and this deposit may facilitate removal of the crown from the die.

The invention contemplates forming similar tooth-stub receiving cavities in all crowns of a given size and type so that the tooth stubs to which the latter are to be applied must be all exactly alike. This permits any of several similar crowns to be used on any of the stubs and none of the crowns is specially made to fit a particular one.

Fixed standards for preparation of tooth stubs are therefore provided, one for each general type and/or size of tooth and the several individual standards thus compose a series of standards all desirably based upon the best professional opinions as to the proper forms therefor. These standards are of course subject to modification in the light of developments in dental research and are not absolutely fixed, but authoritative professional opinion is at present sufficiently established to enable adoption of a series of standards conforming thereto with at least reasonable satisfaction to a majority of dental practitioners.

The several standards are desirably exemplified in a manner making them readily available for accurate comparison during the tooth stub preparation by the provision of a series of suitably marked matrices respectively having cavities conforming to the complements of the several styles and types of tooth stubs. Such matrices enable the dentist to readily conform the tooth stub substantially exactly to the proper standard, for by applying the corresponding matrix thereto from time to time after approximately forming the stub, and grinding at points where this operation indicates further grinding is requred, the tooth stub preparation is greatly simplified. Upon completion of the preparation of the tooth stub in this manner a crown made in accordance with the invention may be immediately applied thereto, the crown, as a result of the method of its production and the correspondence of the matrix standards with crown manufacturing ones, having a cavity which the prepared tooth stub fits exactly, desirably with sufficient clearance between them to allow room for a film of cement to hold them together.

Referring now more particularly to the apparatus shown in the drawing, a two-part mold 1 used in making the crown blank from a porcelain mix is illustrated in Figs. 1–4 inclusive and comprises a lower part 2 and upper part 3 preferably made of bronze or other suitable non-corrosive metal, the lower part 2 having formed in its surface a mold cavity 4 which shapes one portion of the external surface of the blank. A small semi-cylindrical groove 5 leads from the cavity 4 to one end of an enlarged generally semi-cylindrical recess 6 the end faces of which are angularly chamfered as will hereinafter more fully appear, and from the opposite end a larger channel 7 extends to the edge of the mold part. Threaded studs 9, used to hold the assembled mold parts together project beyond the top face of the mold part 2, the lateral edges of which are relieved as indicated at 10 to reduce weight and minimize warping. Channel 7 has a hole 11 adjacent its center adapted for the reception of a taper pin 12, the function of which will hereafter be more fully explained.

The upper part 3 of the mold is complementary to the lower one and contains a mold cavity 15 which complements the mold cavity 4 in shaping the outside of the crown blank when the upper part is inverted and superposed on the lower one. Cavity 15, groove 16, recess 17 and channel 18 in this face respectively generally correspond to the mold cavity 4, groove 5, recess 6 and channel 7 in the lower mold part. The inner end of the channel 17 adjacent the cavity 15 is chamfered off at a different angularity from that of the corresponding end of the recess 6 in the lower mold part, however, although the angularity of their opposite ends may be substantially similar. Holes 19 in the upper mold part receive the studs 9 whereby butterfly nuts 20 may be set up on the studs to clamp the assembled mold parts together.

The lateral edges of the mold forming face of this part of the mold are relieved as indicated at 21 in the same manner as in the lower part, while a die guide 22 fits into the socket formed by the recesses 6 and 17 and has its ends chamfered to conform thereto, whereby the differences in angularity of the chamfers at the inner ends of the recesses and corresponding differences in the chamfers at one end of the guide insure proper setting of the guide in the socket formed by the recesses, as it can be snugly fitted thereinto in only one way, and also inhibit its rotative movement therein when the mold parts are clamped together.

The die guide 22 has a counterbored axial bearing hole 23 into which a key 24 projects and which receives a plunger 25 having a key way 26 for the key thus enabling the plunger to slide axially in the bearing hole 23 but preventing its rotation therein. The plunger 25 carries a male die 27 formed as the complement of the cavity to be provided in a crown blank made in the mold and thus corresponding generally to the standard tooth stub shape but with dimensions uniformly somewhat larger to compensate for shrinkage of the material during manufacture of the crown. After the mold has been filled and assembled, the die is projected into the porcelain mix in the mold cavity until the head of the plunger 25 engages a shoulder 28 in the guide bearing hole to prevent further projection of the die and to regulate the depth of the tooth stub receiving cavity it can form in the crown blank. As the dimensions of the mold cavity and die are between 15% and 25%, for example 17%, larger than the corresponding dimensions of the desired crown and prepared tooth stub intended for its reception, when the porcelain mix in the mold cavity is thus subjected to pressure by projection of the die thereinto, a compact oversized crown blank CB is formed and excess moisture and air and gas bubbles are driven out through the joint between the mold parts. Pin 12 is then inserted through holes 11 and 29 in the mold parts adjacent the rear end of the plunger and the latter thereby firmly held in place.

The filled mold is then subjected to mild heat to dry the porcelain and substantially solidify the crown blank CB therein; a temperature of about 300°–500° F. is preferably used for this purpose and the blank subjected thereto for a period of time which depends upon the specific character of the porcelain used. Thus some porcelains may dry sufficiently in about 15 minutes at a given temperature while others may require an hour or more at substantially the same temperature.

After the crown blank CB has been dried, the mold is removed from the heating chamber and cooled and then taken apart, enabling the dried and thus fairly strong and solid crown blank to be removed. The crown blank now possesses sufficient inherent strength to be substantially self-supporting at room temperature, and after its removal from the mold cavity and withdrawal from the end of the plunger die, it is therefore positioned upright on another smaller "cooking" die 30 having a base 31 forming a narrow generally annular shoulder 32 surrounding an upwardly projected head 33. The contour of this shoulder corresponds substantially to the desired finished contour of the inner edge of the crown and hence substantially to a typical "gum line" while the head itself corresponds in size and shape substantially exactly to the conformation of the tooth after its preparation for reception of the crown. The dried, but still oversize crown blank CB when placed on the "cooking" die is supported from the shoulder 32, and the cavity in the blank produced by the forming die 27 affords an internal clearance 34 about the head 33 of the cooking die. The die and crown blank are now inserted into a suitable kiln or furnace chamber and subjected to relatively intense heat, desirably at a temperature between 1600° and 2500° F., the exact temperature being substantially determined in accordance with certain characteristics of the material being used, particularly its fusing temperature, which generally lies between about 1700° F. and about 2500° F. The blank is baked at the proper temperature for a period of time usually in the neighborhood of 45 minutes, and is then either slowly cooled to room temperature or more quickly cooled and thereafter annealed or otherwise subjected to customary molded porcelain finishing operations, the baking causing the blanks to shrink to the proper size and shape while the die 30 prevents excessive shrinkage and preserves intact exactly the desired form in the cavity of the finished crown C into which the tooth stub is to be fitted.

To insure such substantially exact conformity of the cavity in the finished crown with the tooth stub, the head 33 of the cooking die is made, as noted, according to a standard or correct form or shape, to which the dental practitioner is similarly required to adhere in preparing the tooth stub. I facilitate this operation by providing him with a matrix 36 having a cavity 37 substantially complementary to the head 33 of the cooking die, that is, substantially conforming to the cavity in the finished crown C. This matrix, desirably made of a suitable plastic material, non-corrosive metal, or the like enables the dentist, by applying it to the tooth during preparation to establish substantially exactly wherein further grinding of the tooth is required to make it conform to the matrix cavity. This is usually facilitated by coating the matrix cavity with a marking compound before applying it to a tooth and then after removing the matrix, grinding off the "high spots" revealed through transfer of the marking compound to the tooth. When the matrix is made of a transparent substance such as a clear plastic mere observation may be sufficient to enable the dentist to determine the manner in which the tooth requires further preparation.

The practicing dentist is therefore desirably provided with a complete set or assortment of matrices of this character, each suitably marked for identification and respectively having cavities conforming to the cavities in the several different types and sizes of tooth crowns available. He can then prepare a tooth stub and at once apply a properly fitting crown thereto instead of requiring the patient to wait, after his tooth has been prepared to receive a crown, until the crown is made and ready to be applied to the tooth.

Thus in accordance with the invention a molded porcelain dental crown is available and can be applied to the patient's tooth as soon as the latter is prepared for its reception; moreover, such crowns can be produced in quantity at relatively low cost so their cost to patients as well as the inconvenience and discomfort heretofore incident to their application may be materially reduced while the delay resulting from making a crown specially after the tooth stub has been prepared for its reception is eliminated.

I have herein described my invention with considerable particularity especially as it may be utilized in the production of a specific tooth crown, but it will be understood I do not desire or intend to limit or confine myself thereto or thereby in any way as the apparatus employed therefor and herein shown and described is merely illustrative of apparatus adapted for use in this practice of my method, and changes and modifications in the specific manner of performing the several steps of the latter, in their relation to each other and otherwise will readily occur to those skilled in the art and may be made if desired without departing from the spirit and scope of the invention as defined in the appended claims.

Having thus described my invention, I claim and desire to protect by Letters Patent of the United States:

1. A method of making a molded ceramic dental crown which comprises forming a ceramic mix to substantially the shape of the finished crown on an enlarged scale, compacting the mix by forcing into it a substantial replica of the tooth stub to which the crown is ultimately to be attached and then subjecting it to baking heat while maintaining its external periphery substantially free from contact with extraneous objects.

2. A method of making a molded ceramic dental crown which comprises forming a ceramic mix to substantially the shape of the finished crown on an enlarged scale, compacting the mix by forcing into it a substantial replica of the tooth stub to which the crown is ultimately to be attached and then subjecting it to baking heat while maintaining its external periphery substantially free from contact with extraneous objects to thereby vitrify the material while maintaining said replica within the mass thereof to form therein a cavity complementary to said stub.

3. A method of making a dental crown which comprises depositing a plastic mix in a mold cavity open at one end, forcing into the mix from said end a male die substantially conforming to but larger than the tooth stub to which the crown is to be applied, heating the material in the mold to solidify it, removing it from the die cavity, transferring it from said male die to another male die conforming more precisely to the tooth stub and subjecting it to vitrifying heat to thereby set the material and impart a fusion glaze to its outer surface while maintaining therein a cavity for the reception of the tooth stub.

4. A method of making a dental crown which comprises depositing a plastic mix in a mold cavity, compacting the material in the cavity and forming therein a cavity substantially conforming to an enlargement of the tooth stub to which the crown is to be applied, heating the material in the mold while the cavity in the material is occupied by a male die conforming thereto, removing the formed material from the mold cavity and transferring it to a die conforming to said tooth stub and then heating the material to a higher temperature to vitrify and glaze it.

5. A method of making a dental crown which comprises depositing a plastic mix in a mold cavity, compacting it therein while forming in the compacted material a cavity substantially conforming to an enlargement of the tooth stub to which the crown is to be applied, heating the material in the mold to a temperature of 300°–500° F. while the last mentioned cavity is occupied by a male die conforming thereto, removing the material from the mold and transferring it to a die conforming to said tooth stub and then heating it to a temperature of 1700°–2500° F.

6. A method of making a dental crown which comprises depositing a plastic mix in a mold cavity open at one end, forcing into the mix from said end a male die substantially conforming to the tooth stub to which the crown is to be applied, heating the mix in the mold to solidify it while the die is disposed therein, removing the solidified mix and die from the mold cavity, and then subjecting the mix to vitrifying heat to thereby permanently set the material and impart a glaze to its outer surface.

7. A method of making a dental crown which comprises depositing a plastic mix in a mold cavity, simultaneously compacting the mix and forming therein a cavity substantially conforming to the tooth stub to which the crown is ultimately to be applied by forcing into the mix a substantial replica of said stub, setting the mix in the mold by heating while said replica is disposed therein, and then further heating the mix to a higher temperature to vitrify and glaze it.

IDA L. MEIER.